US007630827B2

(12) United States Patent
Hirn et al.

(10) Patent No.: US 7,630,827 B2
(45) Date of Patent: Dec. 8, 2009

(54) METHOD FOR THE CHARACTERISTIC MAP-BASED OBTENTION OF VALUES FOR A CONTROL PARAMETER OF AN INSTALLATION

(75) Inventors: Rainer Hirn, Neutraubling (DE); Achim Przymusinski, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1020 days.

(21) Appl. No.: 10/528,466

(22) PCT Filed: Sep. 12, 2003

(86) PCT No.: PCT/DE03/02982

§ 371 (c)(1), (2), (4) Date: Mar. 17, 2005

(87) PCT Pub. No.: WO2004/027240

PCT Pub. Date: Apr. 1, 2004

(65) Prior Publication Data

US 2005/0288845 A1 Dec. 29, 2005

(30) Foreign Application Priority Data

Sep. 17, 2002 (DE) ................................ 102 43 146

(51) Int. Cl.
*G06F 19/00* (2006.01)
*F02M 51/00* (2006.01)

(52) U.S. Cl. ........................ 701/115; 701/104; 123/480

(58) Field of Classification Search ......... 701/101-105, 701/110, 111, 115; 123/350, 352, 478, 480, 123/486

See application file for complete search history.

(56) References Cited

U.S. PATENT DOCUMENTS

| | | | | |
|---|---|---|---|---|
| 6,032,637 | A * | 3/2000 | Mamiya et al. | 701/104 |
| 6,546,329 | B2 * | 4/2003 | Bellinger | 701/115 |
| 6,789,527 | B2 * | 9/2004 | Sauler et al. | 123/406.21 |
| 6,944,532 | B2 * | 9/2005 | Bellinger | 701/115 |
| 2004/0000294 | A1 * | 1/2004 | Frankl et al. | 701/104 |
| 2006/0100775 | A1 * | 5/2006 | Michi et al. | 701/200 |

FOREIGN PATENT DOCUMENTS

| | | | |
|---|---|---|---|
| DE | 30 22 427 | A1 | 1/1982 |
| DE | 36 23 538 | C2 | 1/1988 |
| DE | 43 32 171 | A1 | 3/1995 |
| DE | 44 34 455 | A1 | 3/1996 |
| DE | 199 63 213 | A1 | 7/2001 |
| EP | 0 253 077 | A2 | 1/1988 |
| EP | 0 859 141 | A2 | 8/1998 |

(Continued)

*Primary Examiner*—Willis R Wolfe, Jr.
(74) *Attorney, Agent, or Firm*—Laurence A. Greenberg; Werner H. Stemer; Ralph E. Locher

(57) ABSTRACT

Disclosed is a method for the characteristic map-based obtention of values for at least one control parameter of an installation, particularly an internal combustion engine. According to the inventive method, support points for the control parameter, which provide a value for the control parameter, are defined across a range of operational parameters within a characteristic map (4) in accordance with operational parameters of the installation, the range of operational parameters covered in said characteristic map is divided into a first and a second subdomain which comprises several of the support points, and the value for the control parameter is obtained by extrapolation when a boundary of the first subdomain is reached before the value for the control parameter is obtained by accessing support points of the second subdomain.

8 Claims, 3 Drawing Sheets

FOREIGN PATENT DOCUMENTS

| | | | |
|---|---|---|---|
| EP | 1 344 921 | A2 | 9/2003 |
| JP | 58150040 | | 9/1983 |
| JP | 07071356 | A | 3/1995 |
| JP | 10227239 | A | 8/1998 |

* cited by examiner

METHOD FOR THE CHARACTERISTIC MAP-BASED OBTENTION OF VALUES FOR A CONTROL PARAMETER OF AN INSTALLATION

BACKGROUND OF THE INVENTION

Field of the Invention

The invention relates to a method for the characteristic map-based obtention of values for at least one control parameter of an installation, particularly an internal combustion engine, whereby support points for the control parameter, which provide a value for the control parameter, are defined across a range of operational parameters within a characteristic map in accordance with operational parameters of the installation.

For installations, in particular for internal combustion engines, it has long been known to store control parameters in characteristic maps so that an optimal value can be obtained for the control parameter for a current operating point according to the most varied input quantities, such as, for example, speed, load, operating temperature, oil temperature.

For internal combustion engines that can be run in different discrete operating modes, i.e. where one can choose between different operating modes, it is usual to have a characteristic map ready for each operating mode, which map is specific to and optimized for the respective mode. Then when an operating mode is changed, there is a switch over to the characteristic map specific to the operating mode, so that this characteristic map will be accessed in the further operation of the internal combustion engine, in any event as long as the assigned operating mode continues. An example for such an operating mode change can be found in internal combustion petrol engines, which can be run in stoichiometric or various lean operating modes. Normally there are three known operating modes for such internal combustion engines, that is to say, stoichiometric, uniform-lean and stratified-lean.

A further internal combustion engine type which allows several operating modes, are internal combustion diesel engines, whereby fuel is injected from a high pressure reservoir (common-rail injection system). There, the fuel quantity injected for a work cycle can be distributed practically at will into single (shot) injections. In this context, one talks about pre, main and post injections. The flexibility of the design of an injection process effects very many different operating modes for such internal combustion engines, each modes being characterized by the distribution of the fuel quantity per work cycle in the above mentioned injections. As each operating mode must have its own characteristic map held ready, the memory requirement for operating control units of internal combustion engines of this type is greatly increased. Furthermore the application, i.e. the adaptation of an internal combustion engine control structure to a current internal combustion engine model, becomes relatively complex with the plurality of characteristic maps.

SUMMARY OF THE INVENTION

The object of the invention is therefore to provide a method for the characteristic map-based obtention of values for at least one control parameter of an installation of the type cited above, whereby the memory requirement can be kept as low as possible even if there are many different operating modes.

This task is achieved according to the invention by a method for the characteristic map-based obtention of values for at least one control parameter of an installation, particularly an internal combustion engine, whereby support points for the control parameter, each of which provide a value for the control parameter, are defined across a range of operational parameters within a characteristic map in accordance with operational parameters of the installation, the range of operational parameters covered in said characteristic map is divided into a first and a second subdomain which comprises several of the support points, and the value for the control parameter is obtained by extrapolation when a boundary of the first subdomain is reached before the value for the control parameter is obtained by accessing support points of the second subdomain.

Thus the invention departs from the previous approach of providing a specific characteristic map for each operating mode and instead uses subdomains in characteristic maps. As a change from one subdomain to the next corresponds in prior art to the switching between individual characteristic maps, but regularly involves a non continuous change in the value of the control parameter, which change is, it is not possible to simply change from one subdomain to the next, as that would result in a jump. When operating at the boundary of the subdomain, this would lead to continual jumps, this being incompatible with smooth control of the installations.

A hysteresis is achieved by means of the extrapolation according to the invention across the subdomain, which nevertheless results in a continuous, uniform and fault free installation operation despite the transition of the control parameter values at the subdomain boundaries not being constant, even when there are operating points at boundaries of subdomains over a longer period of time. The obtention of values for the control parameter within the subdomains is carried out by the standard method, i.e. by evaluating the support points and possibly suitable interpolation.

Thus the invention carries out a standard interpolation between support points within a subdomain, and in the case of support points at subdomain boundaries, i.e. in the case of support points that are adjacent to other subdomains, the invention carries out an extrapolation based on that support point. By means of the extrapolation, the transitions between the subdomains are cleanly separated and at the same time a memory, in which the characteristic map is held ready, is optimally utilized.

The hysteresis provided for the transition between the two subdomains is in principle already achieved by the fact that an extrapolation occurs starting from a subdomain. A particularly large hysteresis, and hence one resulting in stable operating behavior of the installation, is achieved, however, by effecting an initial extrapolation also after a change of subdomain. It is therefore preferable that when a certain distance from the last support point of the first subdomain is reached, the value is obtained by extrapolation from support points of the second subdomain.

In principle the number of subdomains can be chosen at will, a person skilled in the art will select this in accordance with the operating behavior of the installation. It is particularly preferable for internal combustion engines in particular, that a (discrete) operating mode of the installation is assigned to each subdomain. A one-to-one correspondence between subdomain and operating mode then makes it possible for a single characteristic map to suffice for all operating modes of the installation.

The method according to the invention is especially advantageous with the internal combustion engine type mentioned above, in which engine fuel is injected directly into combustion chambers and the discrete operating modes are differentiated by the number of injections per work cycle. The internal combustion diesel engines mentioned that have direct injection from high pressure reservoirs provide an example of such internal combustion engines.

In the case of internal combustion engines with direct injection, the quantity of fuel that is introduced into the combustion chambers with the main injection is an important parameter for controlling the operation of the internal combustion engine. A further injection parameter is the time of the injection. Therefore, it is especially preferred that the characteristic map contains values of injection parameters in accordance with speed and load of the internal combustion engine, whereby the injection parameters can include injection quantity and/or injection angle.

The 1:1 assignment mentioned, between subdomains of the characteristic map and operating modes of the internal combustion engine, has the advantage that an application, i.e. an adaptation of a control structure to an internal combustion engine model, is especially simple. It then possible to control the internal combustion engine in such a way that when the stated specific operating state is reached, i.e. when a boundary of a subdomain is reached, simultaneously a change of the operating mode is carried out. Then, the subdomain of the characteristic map which is assigned to the respective operating mode is always accessed in order to obtain the values of the at least one control parameter.

The invention is described in more detail below with reference to the drawing by way of example in which;

DESCRIPTION OF THE PREFERRED EMBODIMENTS

Figure 1:
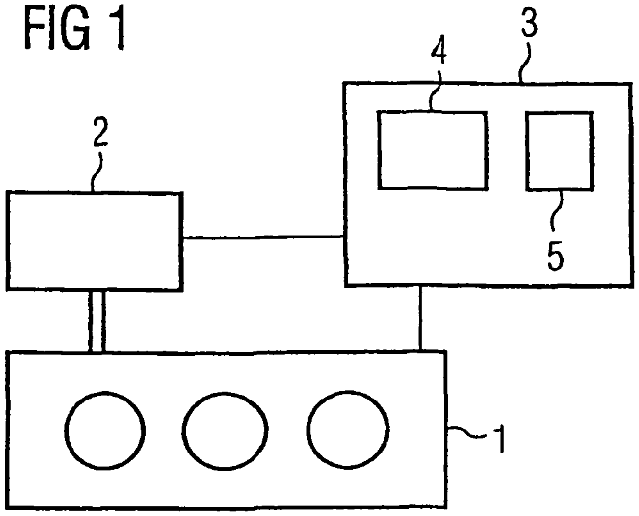
FIG. 1 shows a block diagram of an internal combustion diesel engine with high pressure reservoir injection.

FIG. 1 shows a schematic representation of an internal combustion engine 1, which has a injection system 2, which injects the fuel directly into the combustion chambers of the internal combustion engine 1 via (not shown in detail) lines and injectors. The injection system 2 has a high pressure accumulator, which feeds injectors leading into the combustion chambers of the internal combustion engine 1. These injectors of the injection system 2 can be controlled independently of the rotational position of a crankshaft of the internal combustion engine 1, so that it is possible to freely control the injection discharge rate from the high pressure accumulators.

A control device 3 controls both the internal combustion engine 1 and the injection system 2, said control device being connected to these units via lines (not shown in detail). The control device 3 has a characteristic map 4 and a control core 5, which control the operation of the internal combustion engine. Values for the duration of injection as function of the speed and load of the internal combustion engine are stored in the characteristic map 4 (which is detailed further later), the characteristic map having several support points, each of which provide a value for the injection quantity for a specific combination of load/speed.

The control device 3 naturally has other characteristic maps and control elements, which are, however, of no further relevance for the following description for the characteristic map-based obtention of values for a control parameter.

The control device 3 controls the injection system with respect to the duration the injectors are active. Thereby, as already mentioned, different injection discharge rates can be set for a work cycle. For example, the control device 3 of the internal combustion engine 1 can realize the injection discharge rates illustrated in FIGS. 2 to 5. In FIGS. 2 to 5, a fuel quantity rate MF over the time t is illustrated in each injection discharge rate 6.

Figure 2:
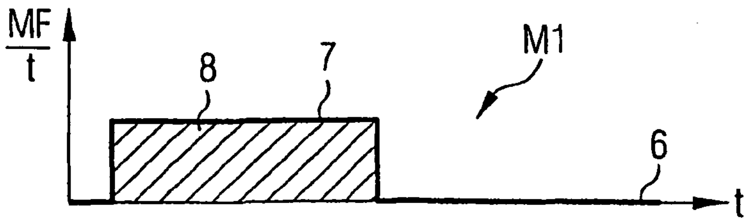
FIGS. 2-5 shows time sequences of the process of an injection for a work cycle of a cylinder in an internal combustion engine of FIG. 1.

FIG. 2 shows a first operating mode M1, in which the injectors only deliver one main injection 7. Thereby, a fuel quantity 8 of the main injection 7 results from the integration of the fuel quantity rate MF over the time t of the main injection 7.

Figure 3:
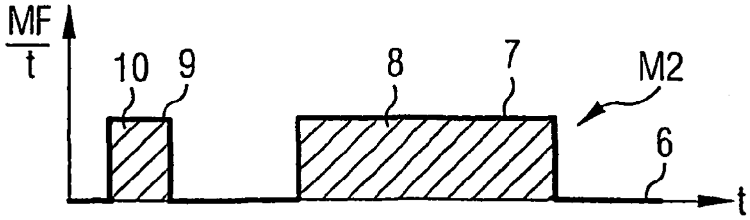

FIG. 3 shows another mode M2, which differs from the mode M1 in the fact that the main injection 7 precedes a pre-injector 9. Thereby, in the main injection 7 the fuel quantity 8 is delivered, and a fuel quantity 10 is delivered by the pre-injector 9. Normally, such pre-injectors are used to make combustion proceed “softly” and to reduce the operating noise of an internal combustion engine.

Figure 4:
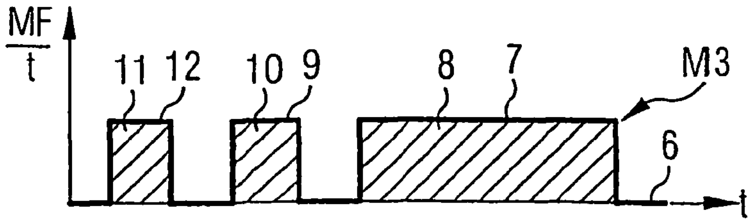

A further reduction in noise is produced in a mode M3, illustrated in FIG. 4. Here an additional pre-injector 11 precedes the pre-injector 9, and said pre-injector 11 injects a fuel quantity 12 into the combustion chamber. Otherwise mode M3 corresponds to mode M2.

Figure 5:
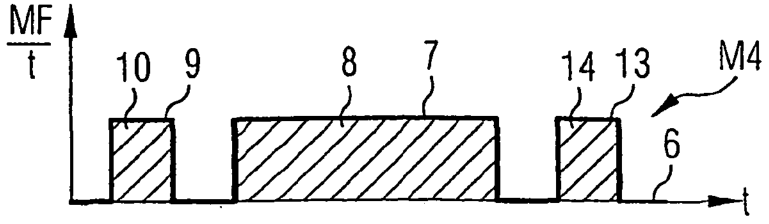

The great flexibility that the injection system supplied from a pressure reservoir allows is shown in FIG. 5 in which a further mode M4 is illustrated. In this mode, in addition to the main injection 7, which feeds the fuel quantity 8 into the combustion chamber, and to the pre-injector 9, which contains the fuel quantity 10, a post injector 13 with a fuel quantity 14 is delivered after the main injection 7. Using such a post injector produces an increase in torque at low speeds.

As can be clearly seen, in the operation of the internal combustion engine 1, only one of the modes M1 to M4 can be executed at a time. The control device 3 therefore effects an appropriate mode switch, which is triggered by control core 5, which has recourse to the characteristic map 4 and ensures that the internal combustion engine 1 is always running in the most appropriate operating mode M1 to M4. Thereby, the control core 5 accesses the characteristic map 4, schematically represented in FIG. 6, in order to select or determine the fuel quantity 8 of the main injection 7.

Figure 6:
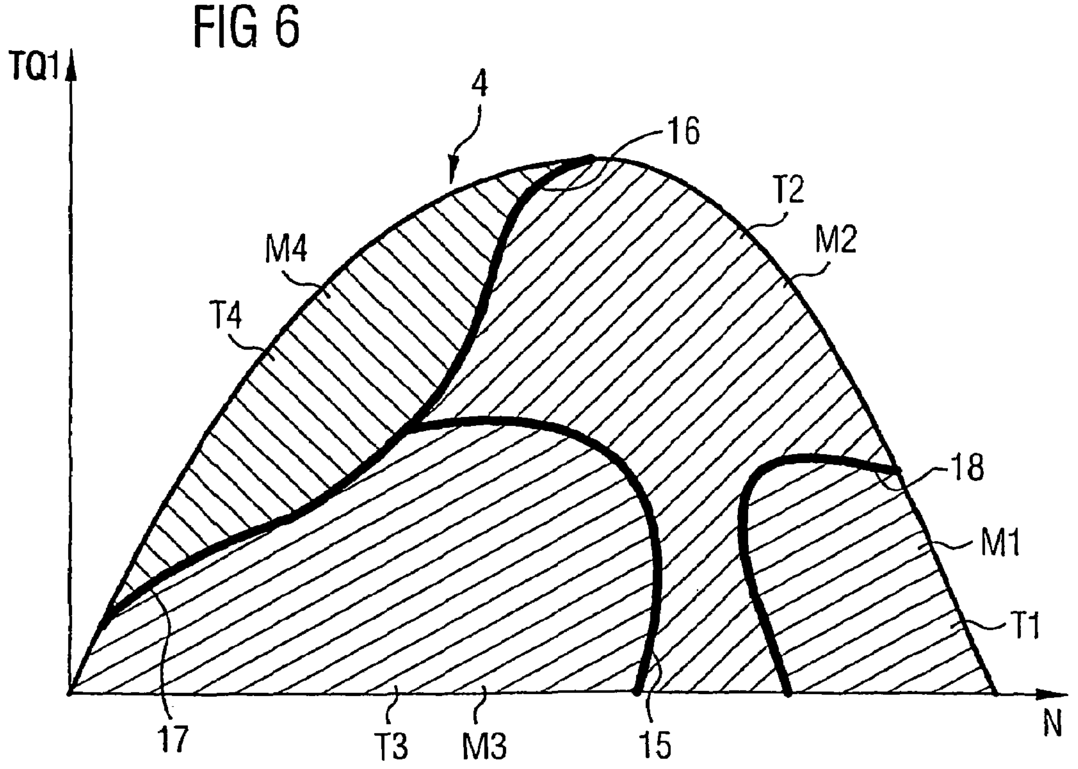
FIG. 6 shows a schematic representation of a characteristic map for the operation of the internal combustion engine in FIG. 1, FIG. 7 a flow chart for the obtention of control parameter values in the internal combustion engine in FIG. 1, FIG. 8 a model cycle through the characteristic map in FIG. 6 in an operational phase at a constant speed and FIG. 9 the values for a control parameter obtained during the cycle in FIG. 8.

FIG. 6 shows the basis of the characteristic map 4, which extends over the speed N and the torque TQI. The shaded areas of the characteristic map 4 contain support points, each of which provides a value for the fuel quantity 8. In a three dimensional interpretation of the characteristic map 4 the support points would be vectors running perpendicular to the plane of projection, the length of which vectors specifies the fuel quantity 8. Thereby, the support points (not drawn in FIG. 6) are distributed across the shaded areas of the characteristic map 4, the distribution being normally, though not necessarily, equidistant. Thus a higher support point density can be planned for certain operational areas, in particular where speeds are low.

The characteristic map 4 has four subdomains T1 to T4, which are allocated to the respective operating modes M1 to M4. The diagrammatic view in FIG. 6 differentiates the subdomains by the shading. The subdomains border on each other in transition areas 15 to 18, whereby the transition area 15 separates the subdomains T2 and T3 (corresponding to the modes M2 and M3), the transition area 16 separates the subdomains T2 and T4 (corresponding to the modes M2 and M4), the transition area 17 separates the subdomains T3 and T4 (corresponding to the modes M3 and M4) and the transition area 18 separates the subdomains T1 and T2 (corresponding to the modes M1 and M2) from each other. There are no support points in the transition areas 15 to 18, which are symbolized by thicker black lines in FIG. 6.

Figure 7:
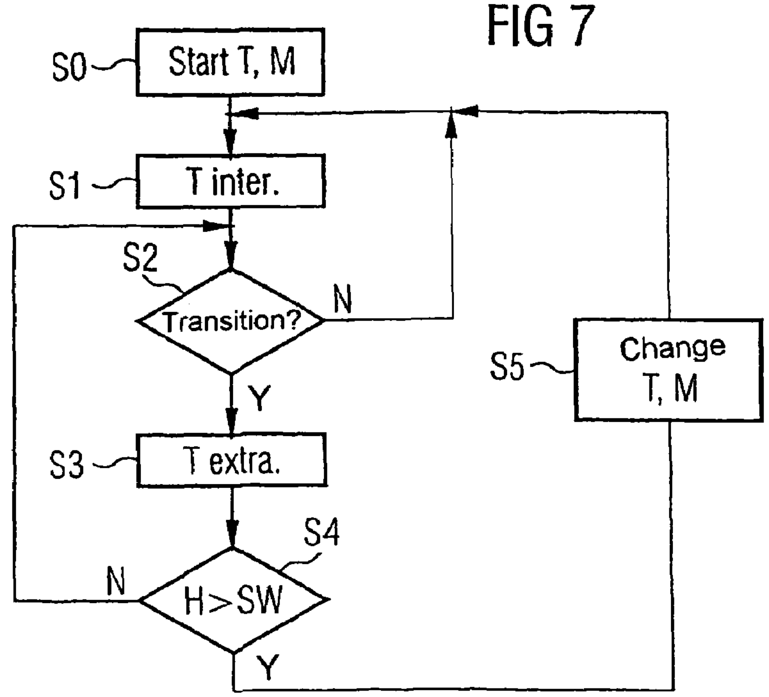

To achieve a smooth running of the internal combustion engine when the internal combustion engine 1 is operated near or in the vicinity of one of the transition areas 15 to 18, the transition areas 15 to 18 are used to execute a hysteresis, as represented in FIG. 7 as a flow chart.

First in a step S0, the internal combustion engine is started with defined subdomain and defined mode, for example, subdomain T3 and mode M3. The values for the fuel quantity 8 are then obtained within this subdomain by an interpolation between the support points; this occurs in step S1. By interpolation it is also understood, of course, that in the event that speed N and torque TQI are exactly at a support point, exactly the value supplied by the support point is used for the fuel quantity 8. Thereby, the internal combustion engine is operated in the operating mode M3, i.e. two pre-injectors 9 and 11 are executed and the main injection 7 lasts so long that the fuel quantity supplied by the subdomain T3 of the characteristic map 4 is delivered by the fuel quantity 8.

After each obtention of a value for the fuel quantity 8, in a step S2 it is queried whether the operating point is in a transition area. This query can be carried out by checking whether there is a further support point within the subdomain for the active mode, beyond the current operating point, i.e. in the direction in which the dynamic of the operation of the internal combustion engine indicates a development of speed N and torque TQI. If this is not the case, there is an operation in the transition area. If there is no transition area (N branch) then a jump back is made before step S1.

If, on the other hand, there is a transition area (J branch) step S3 is continued with, in which step there now occurs an extrapolation with recourse to the support points of the subdomain T3 to find the value for the fuel quantity 8 of the main injection 7.

After each extrapolation, a step S4 queries whether a hysteresis distance H exceeds a threshold value SW. In this way a check is made as to whether the distance from the last support point of the active subdomain, which is valid for the current mode, exceeds the threshold value SW, i.e. it is checked whether there is (still) an operation in the transition area. If this is not the case (N branch) a jump back is made before step S2.

Nevertheless if the hysteresis distance H has exceeded the threshold value SW, i.e. if a certain minimum distance from the nearest support point of the active subdomain is reached, then step S5 (J branch) is continued with, said step effecting a change of the operating mode. Thereby, the change occurs into the mode which has the nearest support point in relation to speed N and torque TQI. Exceeding the threshold value of the hysteresis distance H, thereby ensures that this query delivers an unequivocal result and hence the determination of the operating mode now to be used.

After the operating mode and thus also the relevant subdomain was changed in step S5, step S1 comes in again, i.e. the determination of the fuel quantity 8 is made again by interpolation in the now current subdomain of the characteristic map 4. If an interpolation is not possible, an extrapolation can possibly also be carried out analogously to step S3.

The choice of the threshold value SW for the hysteresis distance H ensures that, in any case, support points of the now current subdomain are closer than those of the subdomain that has just been left.

Figure 8:
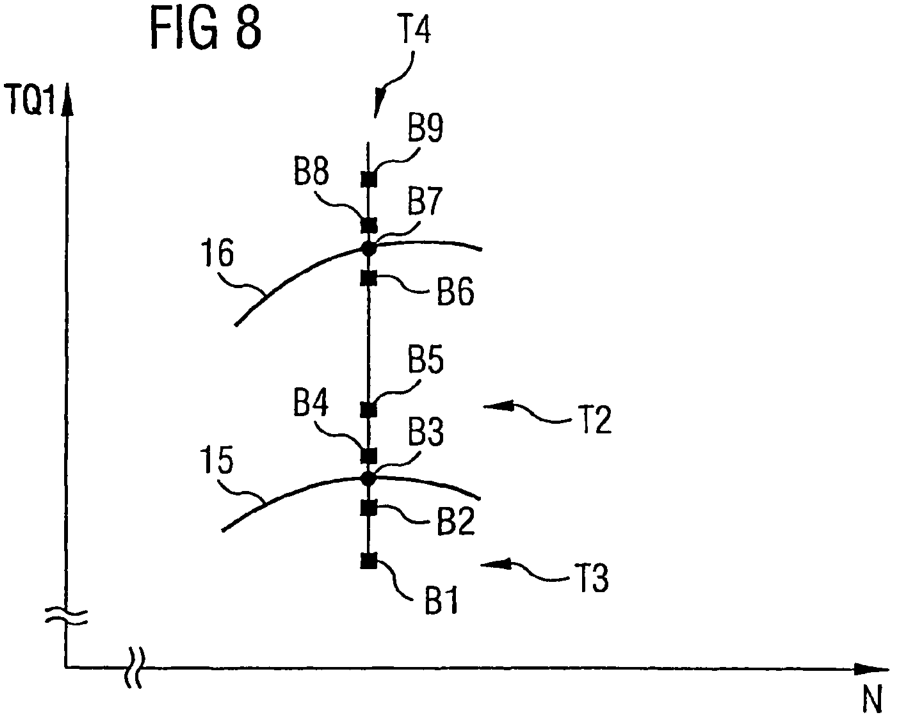
Figure 9:
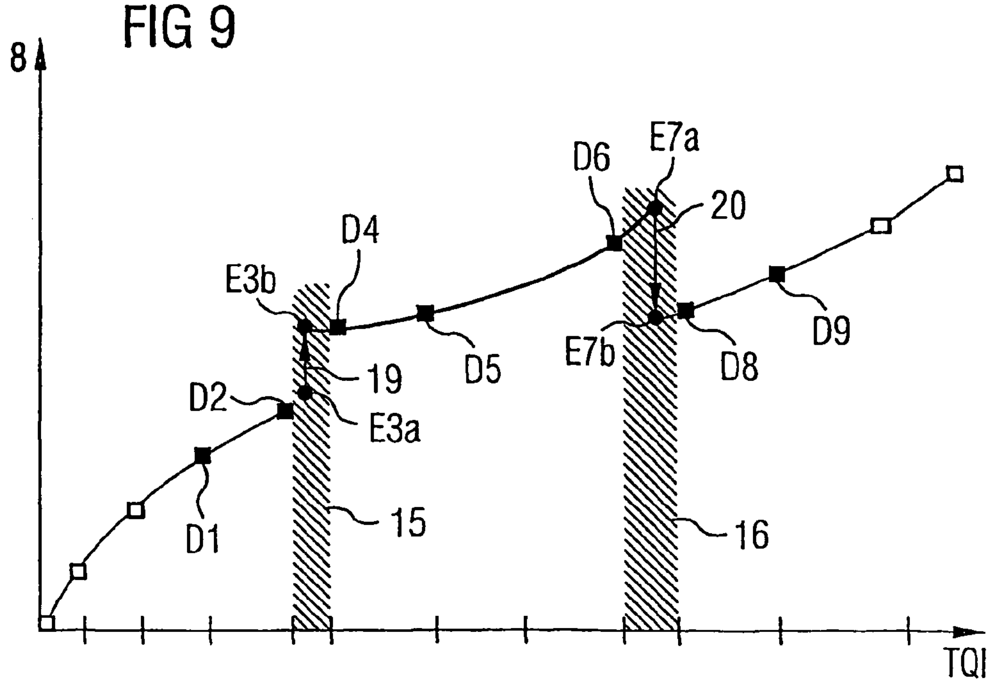

FIGS. 8 and 9 show the process described using FIG. 7 again and in greater detail. FIG. 8 thereby shows a section from the characteristic map 4 in FIG. 6 and shows the passage through two operating mode changes at a constant speed. The graph in FIG. 9 shows the associated fuel quantity 8 as a function of the torque TQI.

Operating points B1 to B9 are drawn in FIG. 8 and FIG. 9 shows the corresponding data points D1, D2, E3*a*, E3*b*, D4, D5, D6, E7*a*, E7*b*, D8 and D9 which are allocated to said points. The data points marked with D are values obtained by interpolation from the characteristic map 4 or a subdomain of the characteristic map 4, the data points marked with E are values obtained by extrapolations.

In the process illustrated in FIGS. 8 and 9, the internal combustion engine 1 is first operated in an operating point B1. For reasons of simplicity, a constant speed will be assumed for the following operating point change. By increasing the torque TQI or the requirement for this torque, the internal combustion engine reaches the operating point B2, which, like the operating point B1 is handled in the mode M3, in which the subdomain T3 is accessed. The data point D2 is obtained for the operating point B2 from the subdomain T3 of the characteristic map 4 by interpolation.

By dint of a further torque increase, the internal combustion engine reaches the operating point B3, which now lies in the transition area 15. Thus now (for the first time) the query in step S2 leads to the J branch. From now on, the fuel quantity 8 is obtained by extrapolation, and hence there is an extrapolated data point E3*a* in FIG. 9. Further development of the torque TQI results in the hysteresis distance H exceeding the threshold value SW, which is why mode change 19 is carried out, and the internal combustion engine subsequently runs in operating mode M2. Thus the additional pre-injector 11 will no longer be delivered.

In operating mode M2, the obtention of the value for the fuel quantity 8 is made by extrapolation with recourse to the values of the subdomain T2 of the characteristic map, so that now an extrapolated data point E3*b* provides the value for the fuel quantity 8 in the operating mode M2. The torque increases further and brings the internal combustion engine to the operating point B4, for which a read-out data point D4 gives the value for the fuel quantity 8 of the main injection 7, and possibly does so by interpolation.

In subsequent torque increases, operating points B5 and B6 are reached in operating mode M2, and (read-out) data points D5 and D6 are allocated to said operating points. The torque TQI continues to rise, this results in an operating point B7, which operating point is in a transition area, in this case in the transition area 16. Here the description given for the transition area 15 applies analogously, i.e. the next value for the fuel quantity 8 is obtained by extrapolation at a data point E7*a*, whereby the support points of the subdomain T2, which is allocated to the operating mode M2, are used for the extrapolation.

In the moment in which the hysteresis distance exceeds the threshold value (J branch of step S4), there is a mode change 20, and when the internal combustion engine is operated in mode M4, now in addition post injector 13 is delivered. The valid fuel quantity 8 of the main injection 7 for this operating mode is obtained from subdomain T4 by extrapolation, so that there is an extrapolated data point E7*b*. Further torque increases bring the internal combustion engine to operating points B8 and B9, at which the value for the fuel quantity 8 is obtained using data points D8 and D9.

We claim:

1. A method for obtaining, on the basis of a characteristic map, a value for at least one control parameter of an installation, the method which comprises:

defining support points for the control parameter, each of the support points providing a value for the control parameter, across a range of operational parameters within a characteristic map in accordance with operational parameters of the installation;

dividing the range of operational parameters covered in the characteristic map into first and second subdomains each comprising a plurality of the support points;

storing the characteristic map in a control device that controls the installation;

using the control device to obtain a value for the control parameter by extrapolating when a boundary of the first subdomain is reached before the value for the control parameter is obtained by accessing support points of the second subdomain; and wherein the control device uses the control parameter to control the installation.

2. The method according to claim 1, wherein the control parameter is a control parameter of an internal combustion engine.

3. The method according to claim 1, which comprises, when a given distance is reached from a last support point of the first subdomain, obtaining the value by extrapolating from support points of the second subdomain.

4. The method according to claim 1, which comprises using the control device to allocate a discrete operating mode of the installation to each subdomain.

5. The method according to claim 4, which comprises using the control device to change an operating mode of the installation when a given operating state is reached.

6. The method according to claim 4, wherein the installation is an internal combustion engine having fuel injected into combustion chambers, and the method comprises defining the discrete operating modes as differing in a number of injections per work cycle.

7. The method according to claim 6, wherein the characteristic map contains values of injection parameters in dependence on a speed and a load of the internal combustion engine.

8. The method according to claim 7, wherein the injection parameters include at least one of an injection quantity and an injection angle.

* * * * *